(12) United States Patent
Lu et al.

(10) Patent No.: US 6,246,807 B1
(45) Date of Patent: Jun. 12, 2001

(54) OPTICAL CIRCULATOR

(75) Inventors: Liang-Ju Lu, Eden Prairie, MN (US); B. Barry Zhang, Lawrenceville, NJ (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/286,736

(22) Filed: Apr. 6, 1999

(51) Int. Cl.[7] .................................................. G02B 5/30
(52) U.S. Cl. .............................. 385/11; 385/34; 359/484; 359/495
(58) Field of Search ................................. 385/11, 33, 34; 359/484, 494, 495, 496

(56) References Cited

U.S. PATENT DOCUMENTS

| | | |
|---|---|---|
| 4,272,159 | 6/1981 | Matsumoto . |
| 4,294,509 | 10/1981 | Nagao . |
| 4,464,022 | 8/1984 | Emkey . |
| 4,482,202 | 11/1984 | Nagao . |
| 4,762,384 | 8/1988 | Hegarty et al. . |
| 4,988,170 | 1/1991 | Buhrer . |
| 4,991,938 | 2/1991 | Buhrer et al. . |
| 5,204,771 | 4/1993 | Koga . |
| 5,212,586 | 5/1993 | Van Delden . |
| 5,319,483 | 6/1994 | Krasinski et al. . |
| 5,471,340 | 11/1995 | Cheng et al. . |
| 5,574,596 | 11/1996 | Cheng . |
| 5,588,078 | 12/1996 | Cheng et al. . |
| 5,682,446 | 10/1997 | Pan et al. . |
| 5,689,593 | 11/1997 | Pan et al. . |
| 6,002,512 | * 12/1999 | Bergmann et al. . |
| 6,014,244 | * 1/2000 | Chang . |

FOREIGN PATENT DOCUMENTS

| | | |
|---|---|---|
| WO 95/16216 | 6/1995 | (WO) . |
| WO 97/05518 | 2/1997 | (WO) . |
| WO 97/22034 | 6/1997 | (WO) . |

* cited by examiner

Primary Examiner—Hung N. Ngo
(74) Attorney, Agent, or Firm—Altera Law Group

(57) ABSTRACT

An optical circulator has a single focusing element to couple light between the circulator components and two optical fibers. The optical elements The input face of the first birefringent element of the circulator is adapted for the non-parallel light paths resulting from the single focusing element, while maintaining an essentially in-line geometry.

22 Claims, 3 Drawing Sheets

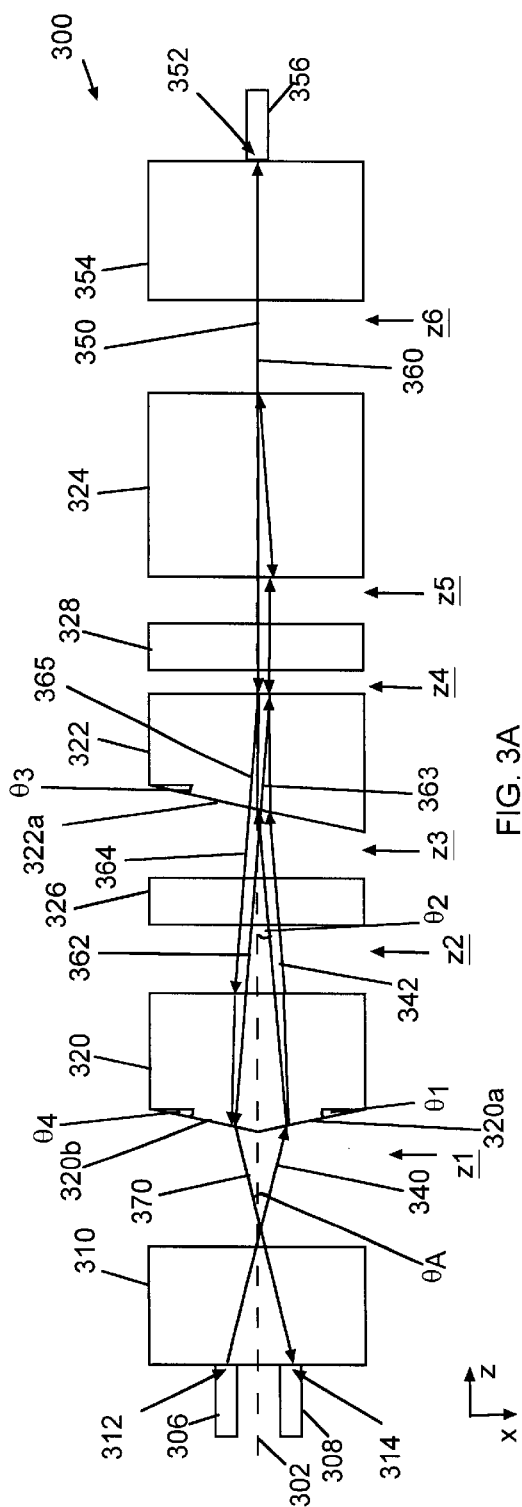
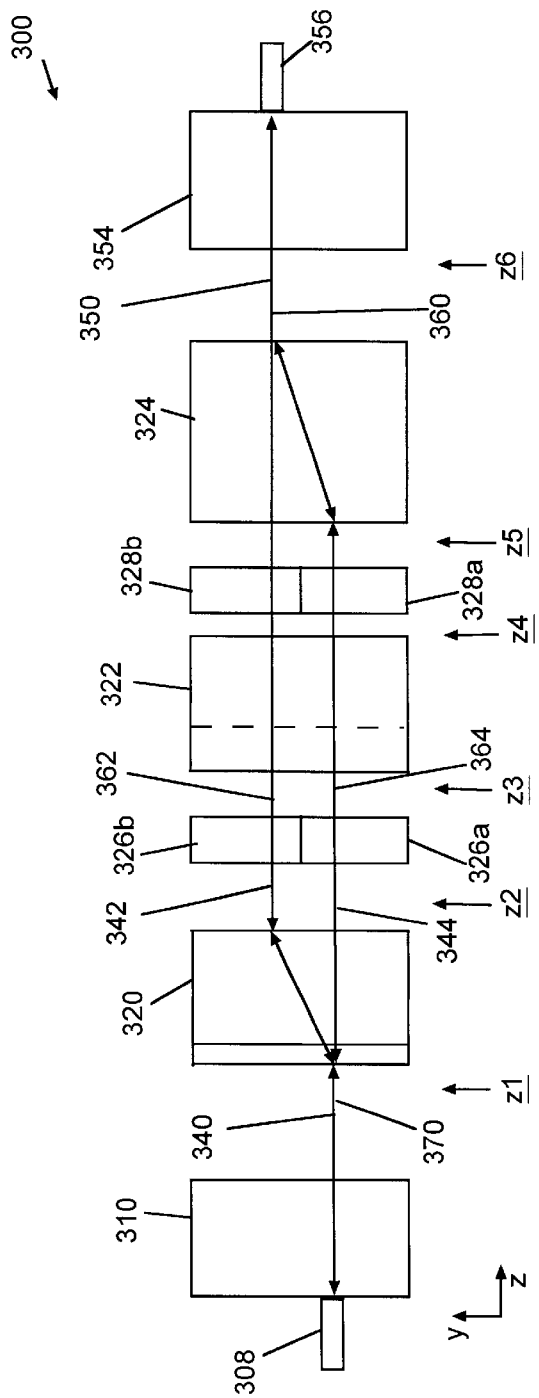
FIG. 3A
FIG. 3B

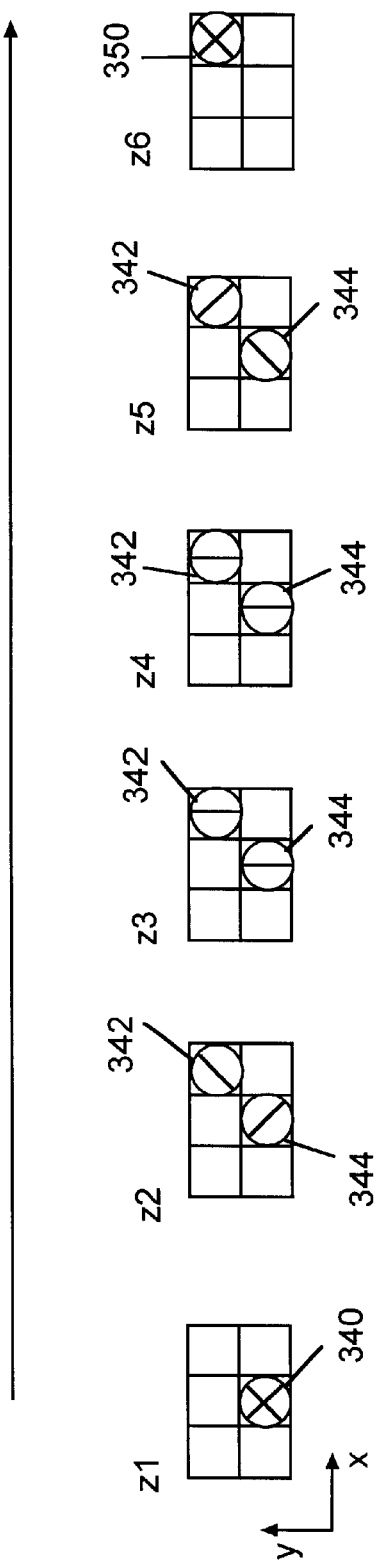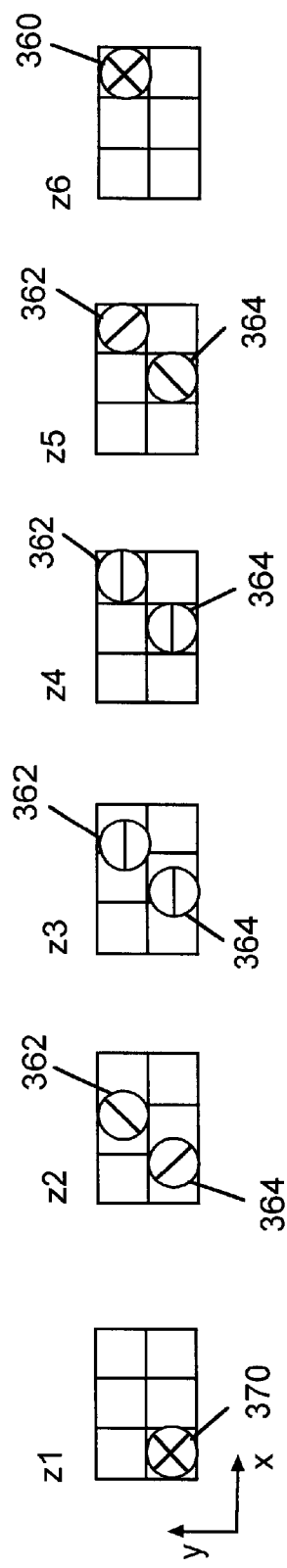
FIG. 4A
FIG. 4B

OPTICAL CIRCULATOR

FIELD OF THE INVENTION

This invention relates to fiber optic devices. In particular, the invention relates to a compact optical circulator.

BACKGROUND OF THE INVENTION

Non-reciprocal devices are used in microwave and optical communications for selectively directing signals from one port to another. With the growth in fiber optic communications, there is an increasing demand for non-reciprocal components that are suitable for use with fiber optic systems. For example, isolators are used for increasing the stability of the frequency and power produced by single mode semiconductor lasers by reducing the power of light feeding back into the laser. As fiber optic systems become more sophisticated, for example with the advent of wavelength division multiplexing (WDM), there is an increased need for advanced components such as optical circulators for use in, for example, multiplexing/demultiplexing and bidirectional transmission.

A variety of circulators can be made. Many circulators have three ports. In these circulators, light incident at the first port is transmitted through the circulator to the second port. This light may then be transmitted to another optical device. Upon returning to the second port, the light is transmitted through the circulator to a third port. Often this third port is close to the first port and, in some cases, the first and third ports include optical fibers held together in contact by a common holder.

Present approaches to circulator design often rely on the use of individual collimating lenses for each fiber. This increases the complexity of aligning the device and necessitates the use of many elements.

SUMMARY OF THE INVENTION

The present invention is directed to reducing the number of elements in the circulator and also reducing the complexity of aligning the components. Generally, the present invention relates to optical circulators having a single focusing element to couple light between the circulator components and two optical fibers forming the first and third ports. The input face of the first birefringent element of the circulator is adapted for the non-parallel light paths resulting from the single focusing element, while maintaining an essentially in-line circulator geometry.

In particular, an optical circulator includes a first birefringent splitting and combining element configured to split an input beam of light propagating from a first port into orthogonally polarized first and second light paths, a first surface of the first birefringent splitting and combining element has input and output portions optically coupled respectively to the first port and a third port, the input and output portions being non-parallel. A first non-reciprocal polarization rotator is configured to rotate polarization directions of light propagating along the first and second light paths from the first splitting and combining element by approximately 45° in respectively opposing directions. A birefringent translating element is disposed along the first and second light paths and configured to laterally displace a light beam having a first polarization direction propagating therethrough and to transmit without lateral displacement a light beam having a second polarization direction orthogonal to the first polarization direction. A second non-reciprocal polarization rotator is configured to rotate electric field vectors of light propagating along the first and second light paths from the translating element by approximately 45° in opposite directions. A second birefringent splitting and combining element is configured to combine light beams propagating along the first and second light paths into an output light beam path directed to a second port.

In another embodiment, a first focusing element optically couples light from first and third ports to a first birefringent splitting and combining element along non-parallel input and output paths respectively. The first birefringent splitting and combining element is configured to split an input beam of light propagating along the input path into orthogonally polarized first and second light paths. A first non-reciprocal polarization rotator is configured to rotate polarization directions of light propagating along the first and second light paths from the first splitting and combining element by approximately 45° in respectively opposing directions. A birefringent translating element is disposed along the first and second light paths and is configured to laterally displace a light beam having a first polarization direction propagating therethrough and to transmit without lateral displacement a light beam having a second polarization direction orthogonal to the first polarization direction. A second non-reciprocal polarization rotator is configured to rotate electric field vectors of light propagating along the first and second light paths from the translating element by approximately 45° in opposite directions. A second birefringent splitting and combining element configured to combine light beams propagating along the first and second light paths into an third light path directed to a second port.

In another embodiment, an optical circulator includes a first birefringent splitting and combining means for splitting an input beam of light propagating along an input path into orthogonally polarized first and second light paths. Input and output beam directing means on a surface of the first birefringent splitting and combining means direct input and output beams passing through the surface. First non-reciprocal polarization rotation means rotate polarization directions of light propagating along the first and second light paths from the first splitting and combining means. Birefringent translating means laterally displaces a light beam having a first polarization direction propagating therethrough and for transmitting without lateral displacement a light beam having a second polarization direction orthogonal to the first polarization direction. Second non-reciprocal polarization rotation means for rotates polarization directions of light propagating along the first and second light paths from the translating means. Second birefringent splitting and combining element means combine light beams propagating along the first and second light paths into an third light path.

The above summary of the present invention is not intended to describe each disclosed embodiment or every implementation of the present invention. The figures and the detailed description which follow more particularly exemplify these embodiments.

BRIEF DESCRIPTION OF THE DRAWINGS

The invention may be more completely understood in consideration of the lowing detailed description of various embodiments of the invention in connection with the accompanying drawings, in which:

FIGS. 3A and 3B illustrate orthogonal views of an optical circulator according to an embodiment of the present invention; and FIGS. 4A and 4B illustrate polarization states of light propagating through the circulator of FIGS. 3A and 3B.

Figure 1:
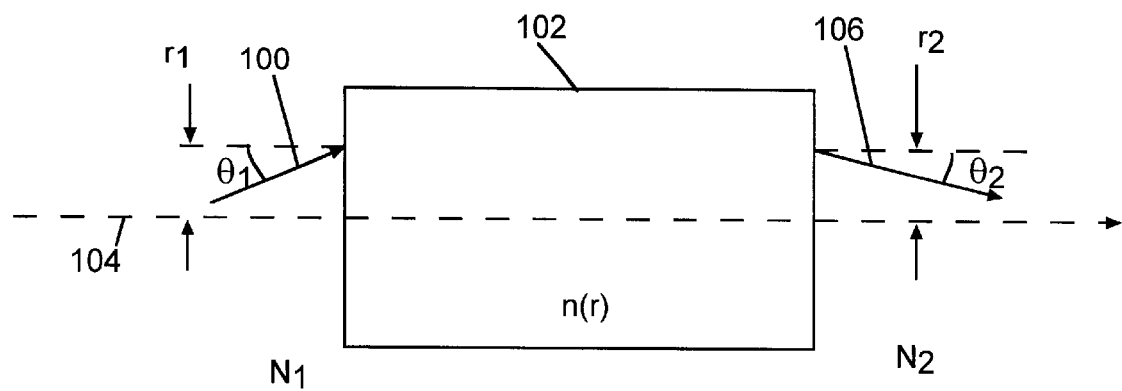
FIG. 1 illustrates the deviation of an optical beam using a gradient index (GRIN) lens.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical circulators and methods of using these circulators, and is directed to a compact optical circulator having a small number of optical components. In a three-port circulator, light entering the circulator through a first port is transmitted to a second port, while light entering the circulator form the second port is directed to a third port. In-line geometries are advantageous for circulators, since the amount of space required for coupling fibers to the circulator is reduced. In a typical structure, the first and third ports are located at one end of an in-line circulator, while the second port is located at the other end. In the present invention, the input beam from the first port and the output beam to the third port do not enter the circulator in parallel directions. This may be a result, for example, of using only one focusing element to couple light into the circulator from fibers forming the first and third ports. The single focusing element is typically used to reduce the divergence of light emerging from a fiber but, however, it introduces an angular separation between incoming and outgoing beams. The input face of the first birefringent element of the circulator is adapted to accommodate the non-parallel input and output beams. In particular, the input face includes input and output portions that are non-parallel. While the present invention is not so limited, an appreciation of various aspects of the invention will be gained through a discussion of the example provided below.

First, we consider the redirecting effect of a gradient index (GRIN) lens on a ray of light, as illustrated in FIG. 1. The first ray 100 enters an optical element 102 at a position $r_1$, relative to the axis 104, and at an angle $\theta_1$. The resulting ray 106 emerges from the element 102 at a position $r_2$ relative to the axis 104 and at an angle $\theta_2$. The relationship between the first and resulting rays 100 and 106 may be described using matrix methods as:

$$\begin{bmatrix} r_2 \\ \theta_2 \end{bmatrix} = M \cdot \begin{bmatrix} r_1 \\ \theta_1 \end{bmatrix} \quad (1)$$

where the matrix M is a 2×2 matrix that represents the optical operation of the optical element 102. For a GRIN lens, the relationship between the first ray 100 and the resulting ray 106 is given as:

$$\begin{bmatrix} r_2 \\ \theta_2 \end{bmatrix} = \begin{bmatrix} \cos(z\sqrt{A}) & \dfrac{N_1}{N_0\sqrt{A}} \cdot \sin(z\sqrt{A}) \\ \dfrac{-N_0\sqrt{A}}{N_2} \cdot \sin(z\sqrt{A}) & \dfrac{N_1}{N_2} \cdot \cos(z\sqrt{A}) \end{bmatrix} \cdot \begin{bmatrix} r_1 \\ \theta_1 \end{bmatrix} \quad (2)$$

where $N_1$ is the refractive index of the medium that the light propagates through before entering the GRIN lens, $N_2$ is the refractive index of the medium that the light propagates into from the GRIN lens, and z is the length of the lens. For a GRIN lens situated in air, $N_1=N_2=1$. The refractive index of the GRIN lens, n, as a function of radius, r, is given by the relationship $n(r)=N_0(1-(Ar^2)/2)$. Therefore, $N_0$ is the on-axis refractive index of the GRIN lens and A is a measure of the focusing power of the lens: a greater value of A results in a greater focusing power.

Figure 2:
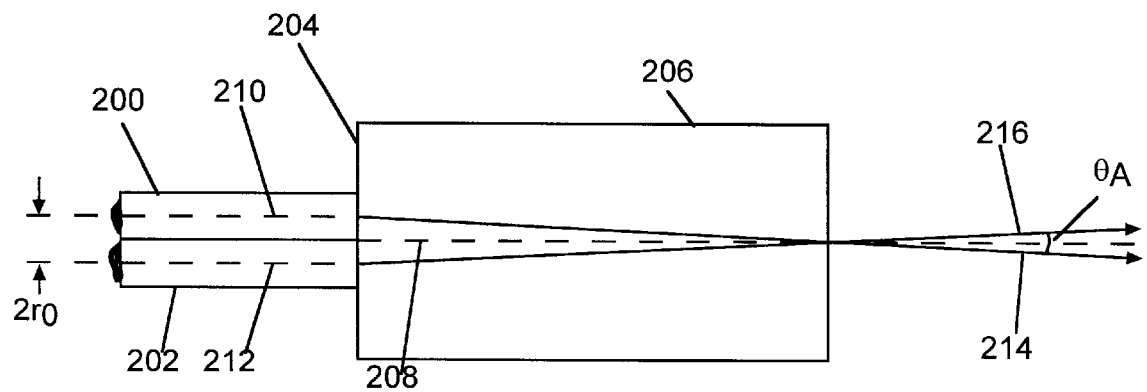
FIG. 2 illustrates paths for light propagating from optical fibers coupled to a GRIN lens.

Consider next the situation illustrated in FIG. 2, where first and second fibers 200 and 202 are placed at the input face 204 of a shared GRIN lens 206. In this case, the fibers 200 and 202 are placed symmetrically about the axis 208 of the GRIN lens 206 and are in contact with each other. The first fiber 200 lies on a first fiber axis 210 and the second fiber 202 lies on a second fiber axis 212. A first ray of light 214 emerges from the first fiber 200 and a second ray of light 216 emerges from the second fiber 202. Since the first and second fibers 200 and 202 are both off-set from the axis 208 of the GRIN lens 206, the first and second rays 214 and 216 emerge from the GRIN lens 206 in directions that are non-parallel with the axis 208.

The angle, $\theta_A$, between the first and second rays 214 and 216 may be calculated using equation (2) presented above. Where the fibers are in contact with each other, the separation between the fiber axes 210 and 212 may be taken as the sum of radiuses for the first and second fibers 200 and 202. Where the fibers 200 and 202 have the same radius, the separation is twice the radius, $r_0$, of the first fiber 200. For example, assume that the fiber radius, $r_0$, is 62.5 $\mu$m, and that the GRIN lens is of the SLW- 180 type manufactured by Nippon Sheet Glass Corp. This type of GRIN lens has a value of $N_0=1.5901$ and a value of $\sqrt{A}=0.326$ mm$^{-1}$, both for an operating wavelength of 1550 nm. Where the length of the GRIN lens is such that $z\sqrt{A}=0.46\pi$, equation (2) may be used to show that the angle, $\theta_A$, between the first and second rays 214 and 26 is equal to 3.68 °.

A circulator 300, useful for incoming and outgoing beams that are not parallel, such as may be produced by a single lens used for coupling to two fibers, is illustrated in FIGS. 3A and 3B.

The circulator 300 includes three birefringent crystals 320, 322 and 324. A first non-reciprocal polarization rotator 326 is positioned between the first and second birefringent crystals 320 and 322, and a second non-reciprocal polarization rotator 328 is positioned between the second and third birefringent crystals 320 and 324 .

Birefringent crystals manifest a well-known phenomenon referred to here as birefringent beam-splitting. When an unpolarized light beam passes into a birefringent crystal, the unpolarized beam is split into two beams, an ordinary ray and an extraordinary ray. This occurs because the refractive indices of the ordinary and extraordinary rays are different. The ordinary and extraordinary rays lie in a plane referred to here as the "walk-off plane". The first and third birefringent crystals 320 and 324 are oriented for birefringent beam splitting and combining of the light beams passing therethrough. The walk-off planes of the first and third birefringent crystals 320 and 324 are arranged to be approximately parallel. The walk-off plane of the second birefringent crystal 320 is oriented at approximately 45° to that of the first birefringent crystal 320.

The birefringent crystals 320, 322 and 324 may be formed from any suitable birefringent material, such as crystalline quartz, lithium niobate, and yttrium ortho-vanadate ($YVO_4$). The birefringent crystal is typically transparent to the light passing therethrough. It will be appreciated that a larger birefringence results in a greater angular separation between the ordinary and extraordinary rays, thus permitting a given separation between the ordinary and extraordinary rays to be achieved in a shorter birefringent crystal. The material $YVO_4$ is particularly advantageous for this purpose, since it has a large birefringence, and hence a large walk-off angle of approximately 6°.

The non-reciprocal polarization rotator 326 may include two Faraday rotators 326a and 326b, and the second non-reciprocal polarization rotator 328 may include two Faraday rotators 328a and 328b. A Faraday rotator is a non-reciprocal polarization rotator in that light passing through a Faraday rotator in one direction may have its polarization rotated through a certain angle in a clockwise direction, as viewed along the direction of propagation. The polarization of the light passing through the Faraday rotator in the opposite direction is rotated through the same angle in the counter-clockwise direction, as viewed along the direction of propagation. In contrast, a reciprocal polarization rotator, such as a half-wave retardation plate, rotates the polarization of light in the same sense, e.g. clockwise, irrespective of the direction of propagation through the plate.

Faraday rotators typically include a transparent material, having a high Verdet constant, that is coupled to a magnet. The magnet produces a magnetic field having a component parallel to the direction of propagation of light within the Faraday rotator. Materials with high Verdet constants include, for example, bismuth-terbium iron garnets, which are often used in Faraday rotators operating at wavelengths in the range 1.3 $\mu$m to 1.55 $\mu$m. Other materials are available for other wavelength ranges. Furthermore, other materials are available that do not require the use of an external magnet, for example bismuth-substituted rare-earth iron garnets.

Light is coupled into the circulator 300 from the first fiber 306 via a first GRIN lens 310. A second fiber 308 is coupled to the first lens 310 to receive an output from the circulator. The first fiber 306 forms a first port 312 for directing light into the circulator 300. The first lens 310 not only reduces the divergence of the light entering the circulator 300. from the first fiber 306, but it also redirects the incoming ray 340 to be non-parallel with the outgoing beam 370 that propagates to the third port 314.

The second fiber 308 forms a third port 314 for taking light output by the circulator 300. The circulator 300 has a second port 352 at the opposite end formed, for example, by a fiber 356 and second GRIN lens 354. Light entering the circulator 300 from the first port 312 is transmitted to the second port 352. Light entering the circulator 300 from the second port 352 is output at the third port 314.

The operation of the circulator 300 is further described with reference to FIGS. 4A and 4B, which show the polarization states of a beam travelling respectively along forward and backward directions. The polarization states are shown for the beam, or beams, at surfaces denoted z1, z2 . . . z6, and are presented as viewed looking along the z-axis, in the +z direction. The x and y axes illustrated in FIGS. 4A and 4B correspond to the y and x axes shown in FIGS. 3A and 3B respectively.

The forward-travelling beam 340 from the first port 312 enters the first birefringent crystal 320 from the left side. The position denoted "z1" represents the first face of the first birefringent crystal 320. The beam 340 entering the first birefringent crystal 320 in the forward, or +z, direction is a mixture of two orthogonal polarizations, as shown by the polarization indicator for the plane z1 illustrated in FIG. 4A. The beam 340 enters the first birefringent crystal 320 through an input face 320a. Most surfaces of the optical components in the circulator 300 are cut to lie approximately normal to a longitudinal axis 302 through the circulator 300. The input face 320a, however, is cut at an angle $\theta_1$ from normal.

The beam 340 is split, in a direction approximately at 45° to the y-axis and x-axis, into an upper beam 342 and a lower beam 344. The non-normal input surface 320a redirects the upper and lower beams 342 and 344 the axis 302. The first birefringent crystal 320 is sufficiently long that the upper and lower beams 342 and 344 are separated when they exit the first birefringent crystal 320.

After passing out of the first birefringent crystal 320, the upper and lower beams 342 and 344 are incident on the first non-reciprocal polarization rotator 326, at z2.

In this embodiment, the Faraday rotator 326b rotates the polarization direction of the upper beam 342 by +45° and the Faraday rotator 326a rotates the polarization direction of the lower beam 344 by −45°, so that the polarization directions of the upper and lower beams 342 and 344 exit the first non-reciprocal rotator 326 with parallel polarization directions, as illustrated for the plane z3. Here, the convention for naming angles is that counter-clockwise rotation, as viewed looking along the z-axis in the +z direction, is positive, while clockwise rotation is negative.

Prior to incidence on the second birefringent crystal 322, the upper and lower beams 342 and 344 propagate at an angle $\theta_2$ relative to the axis 302.

The upper and lower beams 342 and 344 enter the second birefringent crystal 320 through an angled face 322a, which is set at an angle $\theta_3$ from normal to the axis 302 The angle $\theta_3$ is selected so that the beams 342 and 344, after entering the second crystal 322, propagate parallel to the axis 302. The upper and lower beams 342 and 344 pass through the second birefringent crystal 322, to emerge at plane z4 with the same polarization states and positions as at plane z3.

The upper and lower beams 342 and 344 are incident on the second non-reciprocal polarization rotator 328. In this embodiment, the Faraday rotator 328b rotates the polarization direction of the upper beam 342 by +45° and the Faraday rotator 328 a rotates the polarization direction of the lower beam 344 by −45°, so that the polarization directions of the upper and lower beams 342 and 344 exit the second non-reciprocal polarization rotator 328 with orthogonal polarization directions, as illustrated for the plane at z5. Furthermore, the polarization direction of each beam 342 and 342 has received a cumulative rotation of about 90° since exiting the first birefringent crystal 320.

The upper and lower beams 342 and 344 pass into the third birefringent crystal 324. The upper beam 342 now has the orthogonal polarization to the polarization it had passing through the first birefringent crystal 320. Likewise, the polarization of the lower beam 344 is orthogonal to the polarization it had in the first birefringent crystal 320. Accordingly, the beams 342 and 344 are combined in the third birefringent crystal 324 to produce a single output beam 350, as shown at plane z6. The output beam 350 may be passed to a second port 352. that has a lens 354, and a third fiber 356.

We now examine the passage of light through the circulator in the reverse, or −z, direction, with reference to the polarization states shown in FIG. 4B. It should be noted that the sequence of the polarization diagrams in FIG. 4B should be followed from right to left for light travelling from the second port 352. to the third port 314.

A beam 360, as shown for plane z6, enters the third birefringent crystal 324 from the second port 352, and is split into upper and lower beams 362 and 364, as illustrated for the plane z5.

On passing through the Faraday rotator 328b, the polarization of the upper beam 362 is rotated through an angle of +45°. On passing through the Faraday rotator 328a, the polarization of the lower beam 364 is rotated through an angle of −45°. Therefore, at plane z4, the polarization directions of the upper and lower beams 362 and 364 are parallel and orthogonal to the polarization of the forward travelling beams at plane z4.

The upper and lower beams 362 and 364 enter the second birefringent crystal, where they are each translated in the x direction along paths 363 and 365 respectively. The beams 362 and 364 emerge from the angled face 322 a of the second birefringent crystal 322, at plane z3, having experienced an x-translation. The amount by which the beams 362 and 364 are translated within the second birefringent crystal 320 is not drawn to scale.

The upper and lower beams 362 and 364 are then respectively rotated by +45° and −45° in respective Faraday rotators 326b and 326a, so as to have orthogonal polarizations once more, illustrated for plane z2.

The upper and lower beams 362 and 364 are then combined in the first birefringent crystal 320 to produce an output beam 370, at plane z1. The output beam 370 is coupled to the third port 314 in a direction non-parallel to the axis 302. To direct the output beam 370 in the correct direction, the output surface 320b is non-normal to the axis 302. The output surface 320b is set at an angle $\theta_4$ from normal to the axis 302.

A general description of the circulator 300 is that a beam travels through the circulator in the forward direction without receiving any translation within the second birefringent crystal. The component beams of the first beam pass through the second birefringent crystal in the forward direction with a first polarization state. On passing through the second birefringent crystal in the reverse direction, and with a polarization state orthogonal to the first polarization state, the backward travelling component beams receive a lateral translation. Therefore, forward and backward beams travelling along the same path are separable.

It will be appreciated that the relative orientations of some components may be changed without affecting the operation of the circulator 300. For example, the orientation of the second birefringent crystal 320 may be such that forward-travelling beams are translated, while backward-travelling beams remain untranslated. Additionally, the first non-reciprocal polarization rotator 326 may be arranged to rotate the polarization of the forward-travelling upper and lower beams 342 and 344 by approximately −45° and +45° respectively, i.e. in a clockwise direction rather than counter-clockwise. Furthermore, the direction in which the second non-reciprocal polarization rotator 328 rotates the beams passing therethrough may be different from the direction of rotation of the first non-reciprocal polarization rotator 326.

For example, the Faraday rotator 326b may be arranged to rotate the polarization of the upper beam 342 by +45°, while the Faraday rotator 328b is arranged to rotate the polarization of the upper beam 342 by −45°. It will be appreciated that, in such a case, the orientation of the walk-off plane in the third birefringent crystal 324 is selected to combine the upper and lower beams 342 and 344.

The various angles, $\theta_1$, $\theta_2$, $\theta_3$ and $\theta_4$ as shown in FIG. 3A, may be derived from simultaneously solving the following four equations:

$$\sin(\theta_2 + \theta_3) = n_o \cdot \sin(\theta_3)$$
$$\sin(\theta_3) = n_e \cdot \sin(_3 - \theta_w)$$
$$\sin(\theta_A + \theta_1) = n_o \cdot \sin(\theta_1 - \theta_2) \quad (3)$$
$$\sin(\theta^A + \theta_2) = n_e \cdot \sin(\theta_4)$$

The angle $\theta_W$ is the walk-off angle between the ordinary and extraordinary rays in the birefringent crystals. These equations may be solved for any particular birefringent material and a selected value of $\theta_A$.

Various modifications may be made to the circulator. For example, the two fibers coupled as the first and third ports need not be touching each other. Additionally, the coupling lens between the first and third ports may also be a conventional lens with one or two curved surfaces, rather than being a GRIN lens. Furthermore, the two fibers used for the first and third ports need not be of the same diameter.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An optical circulator, comprising:

a first birefringent splitting and combining element configured to split an input beam of light propagating from a first port into orthogonally polarized first and second light paths, a surface of the first birefringent splitting and combining element having input and output portions optically coupled respectively to the first port and a third port, the input and output portions being non-parallel;

a first non-reciprocal polarization rotator configured to rotate polarization directions of light propagating along the first and second light paths from the first splitting and combining element in respectively opposing directions;

a birefringent translating element disposed along the first and second light paths and configured to laterally displace a light beam having a first polarization direction propagating therethrough and to transmit without lateral displacement a light beam having a second polarization direction orthogonal to the first polarization direction;

a second non-reciprocal polarization rotator configured to rotate polarization directions of light propagating along the first and second light paths from the translating element in respectively opposite directions; and a second birefringent splitting and combining element configured to combine light beams propagating along the first and second light paths into an output light beam path directed to a second port.

2. The optical circulator of claim 1, wherein the first non-reciprocal polarization rotator includes first and second Faraday rotators configured to rotate the polarization directions of the light propagating along the first and second light paths respectively, and the second non-reciprocal polarization rotator includes third and fourth Faraday rotators configured to rotate the polarization directions of the light propagating along the first and second light paths respectively.

3. The optical circulator of claim 1, wherein the first birefringent splitting and combining element has a second surface facing the first non-reciprocal polarization rotator and substantially parallel to a longitudinal axis of the circulator, the second surface being non-parallel with the input and output portions of the first surface of the first birefringent splitting and combining element.

4. The optical circulator of claim 1, further comprising a first focusing element positioned to direct incoming light from the first port to the first birefringent splitting and combining element and to direct outgoing light from the first birefringent splitting and combining element to the third port.

5. The optical circulator of claim 4, wherein the first focusing element includes a gradient index (GRIN) lens.

6. The optical circulator of claim 4, further comprising first and second optical fibers optically coupled to the first focusing element.

7. The optical circulator of claim 6, wherein the optical fibers are positioned symmetrically about a focusing axis of the first focusing element and light coupled from the first port to the first birefringent splitting and combining element propagates in a direction non-parallel to light a direction of light coupled between the first birefringent splitting and combining element and the third port.

8. The optical circulator of claim 7, wherein the optical fibers are positioned in lateral contact with each other.

9. The optical circulator of claim 1, further comprising a third optical fiber and a second focusing element positioned to optically couple the output beam path to the third optical fiber.

10. The optical circulator of claim 1, wherein the birefringent translating element has a first surface, facing the first non-reciprocal polarization rotator, non-perpendicular to a longitudinal axis of the circulator, the first and second light paths passing through the first surface.

11. The optical circulator of claim 10, wherein the birefringent translating element has a second surface facing the second non-reciprocal polarization rotator, non-parallel to the first surface and substantially normal to the longitudinal axis, the first and second light paths passing through the second surface.

12. An optical circulator, comprising:
a first focusing element optically coupling light from first and third ports to a first birefringent splitting and combining element along non-parallel input and output paths respectively, the first birefringent splitting and combining element configured to split an input beam of light propagating along the input path into orthogonally polarized first and second light paths;
a first non-reciprocal polarization rotator configured to rotate polarization directions of light propagating along the first and second light paths from the first splitting and combining element in respectively opposing directions;
a birefringent translating element disposed along the first and second light paths and configured to laterally displace a light beam having a first polarization direction propagating therethrough and to transmit without lateral displacement a light beam having a second polarization direction orthogonal to the first polarization direction;
a second non-reciprocal polarization rotator configured to rotate polarization directions of light propagating along the first and second light paths from the translating element in respectively opposite directions; and
a second birefringent splitting and combining element configured to combine light beams propagating along the first and second light paths into an third light path directed to a second port.

13. The optical circulator of claim 12, wherein the first non-reciprocal polarization rotator includes first and second Faraday rotators configured to rotate the polarization directions of the light propagating along the first and second light paths respectively, and the second non-reciprocal polarization rotator includes third and fourth Faraday rotators configured to rotate the polarization directions of the light propagating along the first and second light paths respectively.

14. The optical circulator of claim 12, wherein the first focusing element includes a gradient index (GRIN) lens.

15. The optical circulator of claim 14, further comprising first and second optical fibers coupled to the first focusing element as the first and third ports respectively.

16. The optical circulator of claim 15, wherein the optical fibers are positioned symmetrically about a focusing axis of the first focusing element.

17. The optical circulator of claim 15, wherein the optical fibers are positioned in lateral contact with each other.

18. The optical circulator of claim 12, further comprising a third optical fiber and a second focusing element, the third light path being optically coupled to the third optical fiber through the second focusing element.

19. The optical circulator of claim 12, wherein the birefringent translating element has a first surface, facing the first non-reciprocal polarization rotator, non-perpendicular to a longitudinal axis of the circulator.

20. An optical circulator, comprising:
first birefringent splitting and combining means for splitting an input beam of light propagating along an input path into orthogonally polarized first and second light paths;
input and output beam directing means on a surface of the first birefringent splitting and combining means for directing input and output beams passing through the surface;
first non-reciprocal polarization rotation means for rotating polarization directions of light propagating along the first and second light paths from the first splitting and combining means;
birefringent translating means for laterally displacing a light beam having a first polarization direction propagating therethrough and for transmitting without lateral displacement a light beam having a second polarization direction orthogonal to the first polarization direction;
second non-reciprocal polarization rotation means for rotating polarization directions of light propagating along the first and second light paths from the translating means; and
second birefringent splitting and combining element means for combining light beams propagating along the first and second light paths into an third light path.

21. An optical circulator as recited in claim 20, further including internal beam directing means, disposed on a surface of the birefringent translating means facing the first non-reciprocal polarization rotation means, for directing the light propagating along the first and second light paths to be parallel to a longitudinal axis of the circulator.

22. A method of circulating light from one port to another port, comprising:

splitting a first input beam of light propagating along a first input path from a first port into orthogonally polarized first and second light paths using a birefringent splitter/combiner having an input surface non parallel to an output surface, the first input beam of light passing through the input surface;

rotating polarization directions of light propagating along the first and second light paths to parallelize the polarization directions along a first polarization direction;

rotating the polarization directions of light propagating along the first and second light paths to perpendicularize the polarization directions;

combining light propagating along the first and second light paths into a first output path coupled to a second port;

splitting a second input beam of light propagating along a second input path from the second port into orthogonally polarized third and fourth light paths;

rotating polarization directions of light propagating along the third and fourth light paths to parallelize the polarization directions along a second polarization direction perpendicular to the first polarization direction;

laterally displacing light beams having one of the first and second polarization directions;

rotating the polarization directions of light propagating along the third and fourth light paths to perpendicularize the polarization directions;

combining, in the birefringent splitter/combiner, light propagating along the third and fourth light paths into a second output path coupled to a third port, the second output path being nonparallel to the first input path and passing from the output surface of the splitter/combiner to the third port; and coupling light from the first port to the birefringent splitter/combiner and light from the birefringent splitter/combiner to the third port using a shared lens.

* * * * *